United States Patent [19]
Niedermann

[11] Patent Number: 5,932,876
[45] Date of Patent: Aug. 3, 1999

[54] TUNNEL EFFECT SENSOR, SUITABLE FOR DETERMINING THE TOPOGRAPHY OF A SURFACE

[75] Inventor: Philipp Niedermann, Neuchatel, Switzerland

[73] Assignee: Centre Suisse E'Electronique et de Microtechnique S.A., Neuchatel, Switzerland

[21] Appl. No.: 08/956,703

[22] Filed: Oct. 24, 1997

[30] Foreign Application Priority Data

Oct. 24, 1996 [FR] France .................................. 96 12991

[51] Int. Cl.[6] ...................................................... H01J 37/26
[52] U.S. Cl. ........................................ 250/306; 73/826.68
[58] Field of Search ................................ 250/306, 307; 73/862.68

[56] References Cited

U.S. PATENT DOCUMENTS

| | | | |
|---|---|---|---|
| Re. 33,387 | 10/1990 | Binnag ..................................... | 250/306 |
| 4,668,865 | 5/1987 | Gimzewski et al. ..................... | 250/306 |
| 4,724,318 | 2/1988 | Binnig ..................................... | 250/307 |
| 4,747,698 | 5/1988 | Wickramasinge et al. ............. | 250/306 |
| 4,806,755 | 2/1989 | Duerig et al. ........................... | 250/306 |
| 4,883,959 | 11/1989 | Hosoki et al. .......................... | 250/306 |
| 5,211,051 | 5/1993 | Kaiser et al. ............................ | 73/1 D |
| 5,265,470 | 11/1993 | Kaiser et al. ........................ | 250/338.1 |
| 5,293,781 | 3/1994 | Kaiser et al. ............................ | 250/306 |
| 5,307,693 | 5/1994 | Griffith et al. ....................... | 73/862.68 |
| 5,315,247 | 5/1994 | Kaiser et al. ............................ | 324/244 |
| 5,436,448 | 7/1995 | Hosaka et al. .......................... | 250/306 |
| 5,574,279 | 11/1996 | Ikeda et al. ............................. | 250/306 |
| 5,751,685 | 5/1998 | Yi ............................................ | 250/306 |
| 5,753,911 | 5/1998 | Yasuda et al. .......................... | 250/306 |

FOREIGN PATENT DOCUMENTS

| | | |
|---|---|---|
| 0262253 | 4/1988 | European Pat. Off. . |
| 0389115 | 2/1990 | European Pat. Off. . |
| 0703429 | 9/1995 | European Pat. Off. . |

OTHER PUBLICATIONS

D.A. Grigg et al., "Rocking–beam Force–balance Approach To Atomic Force Microscopy", Ultramicroscopy, vol. 42–44, Part B, Amsterdam, Jul. 1992, pp. 1504–1508.

Nobuhiro Kato et al., "Force–Balancing Force Sensor With An Optical Lever", Review of Scientific Instruments, vol. 66, No. 12, Dec. 1, 1995, pp. 5532–5536.

W. Riethmueller et al., "Thermally Excited Silicon Microactuators", IEEE Transactions on Electron Devices, vol. 35, No. 6, Jun. 1988, pp. 758–763.

*Primary Examiner*—Bruce Anderson

[57] ABSTRACT

A tunnel effect sensor, suitable for determining the topography of a surface, arm for exploring the profile of a surface of the sample by scanning it along two axes. The arm includes a tactile point that can be moved in a direction normal to the surface to be explored and a tunnel point near a tunnel electrode attached to the substrate. A control loop controls the distance between the tunnel point and its electrode. The position of the feeler arm is adjusted by means of the control loop and two actuators operating on the feeler arm in opposite directions. The feeler arm can therefore effect a virtual pivoting movement about the tunnel point. As a result, the sample-holder does not need to be moved along the measurement axis during measurements. Applications include atomic force microscopes.

7 Claims, 8 Drawing Sheets

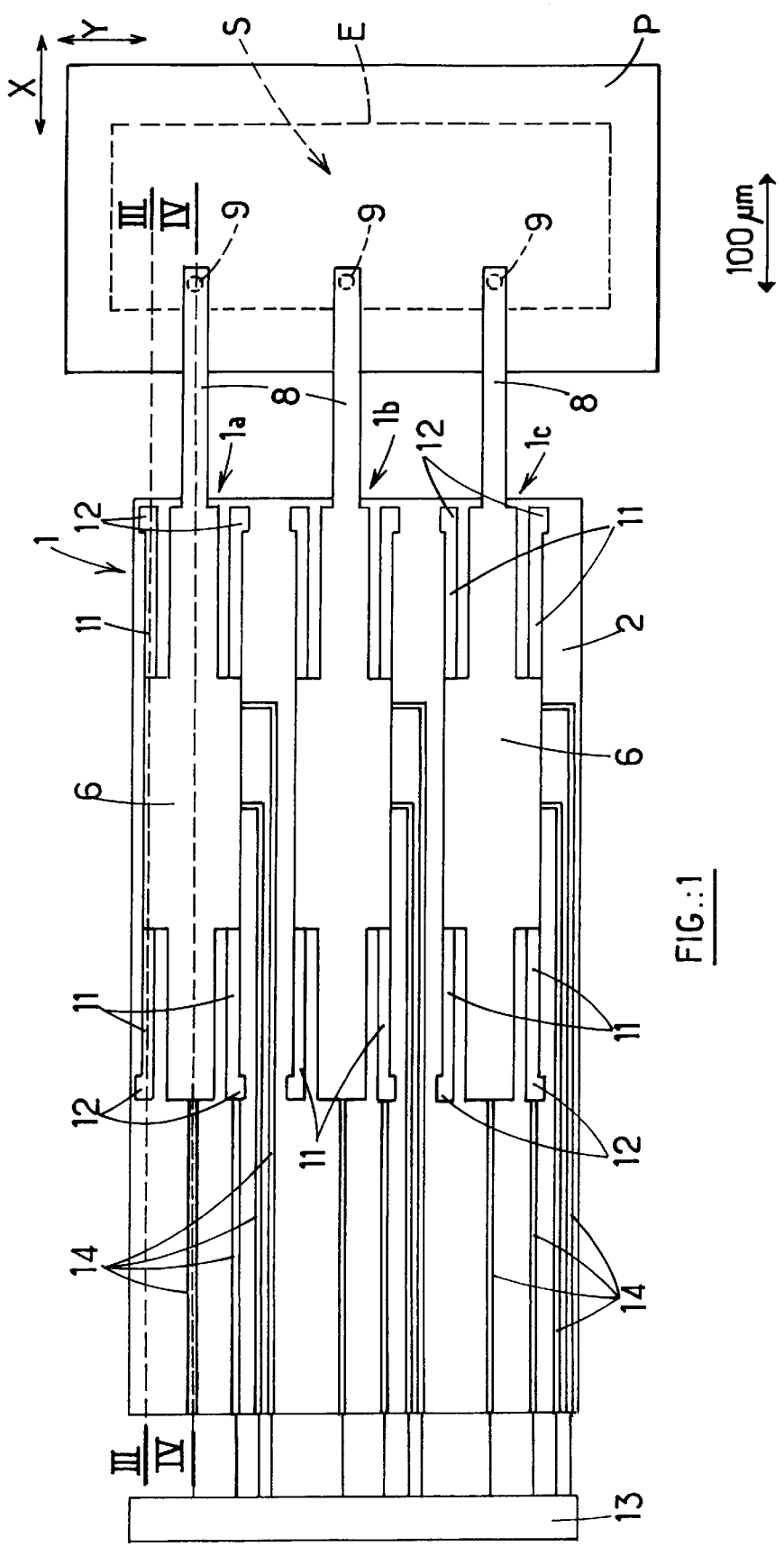
FIG.:1

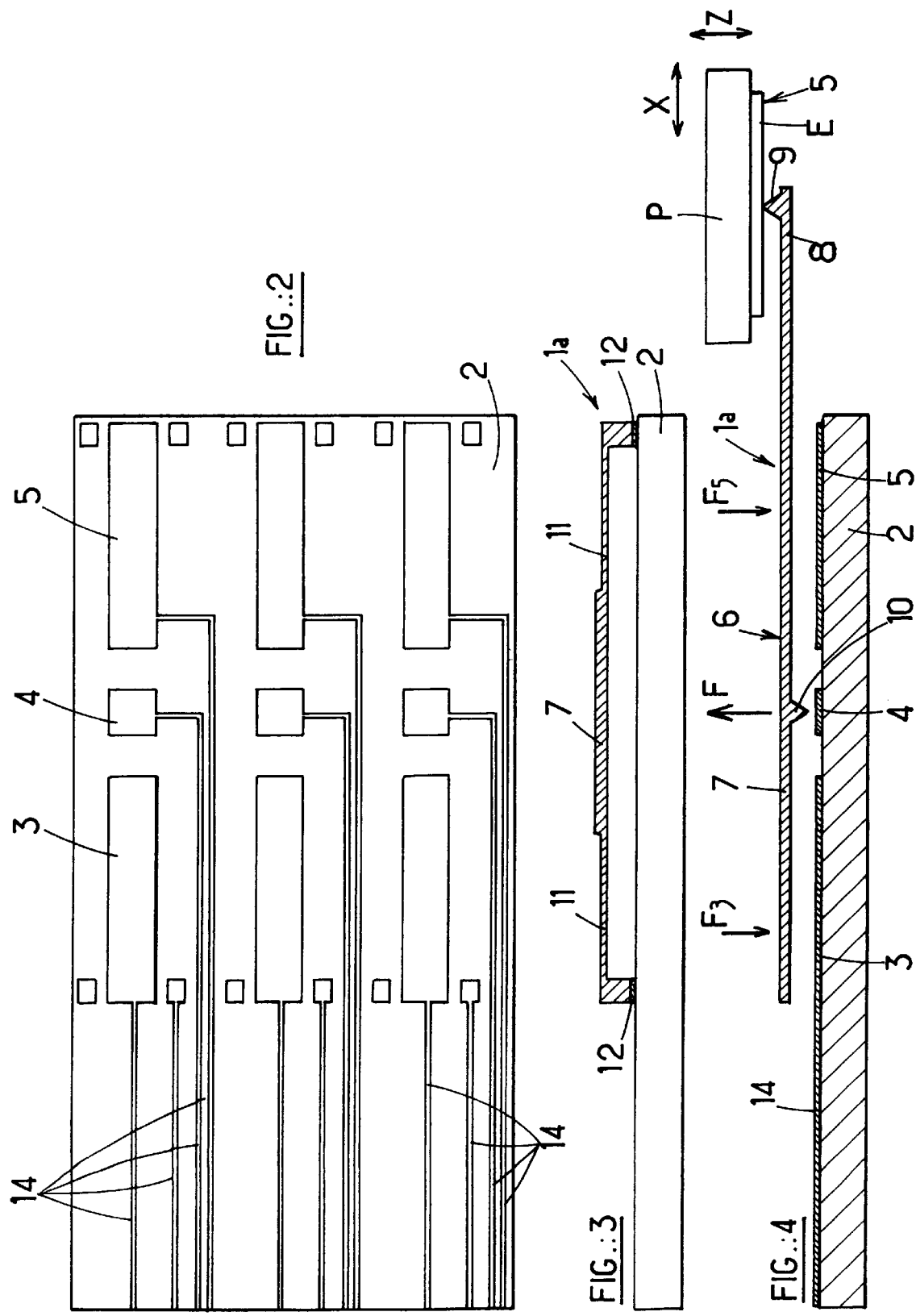

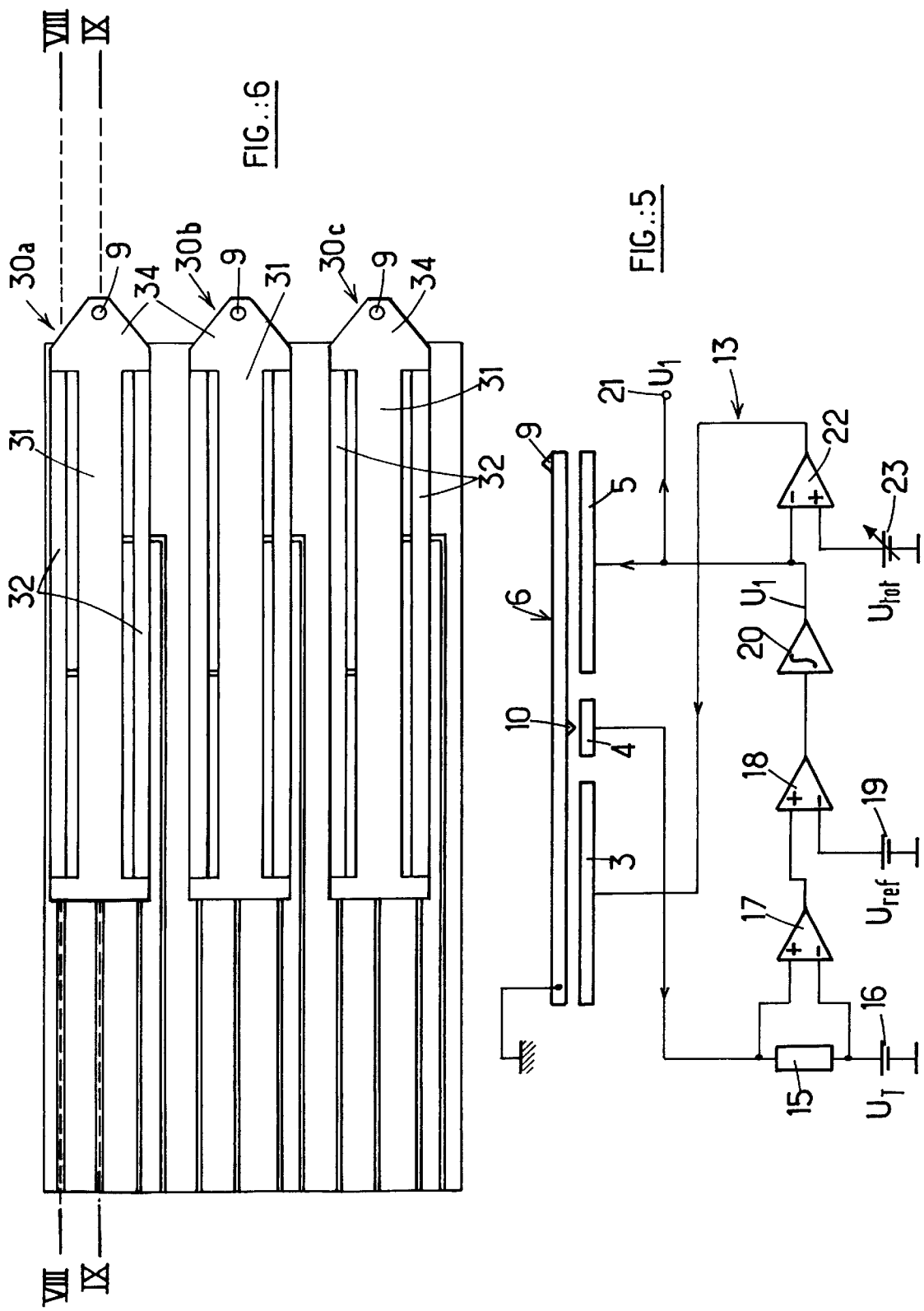

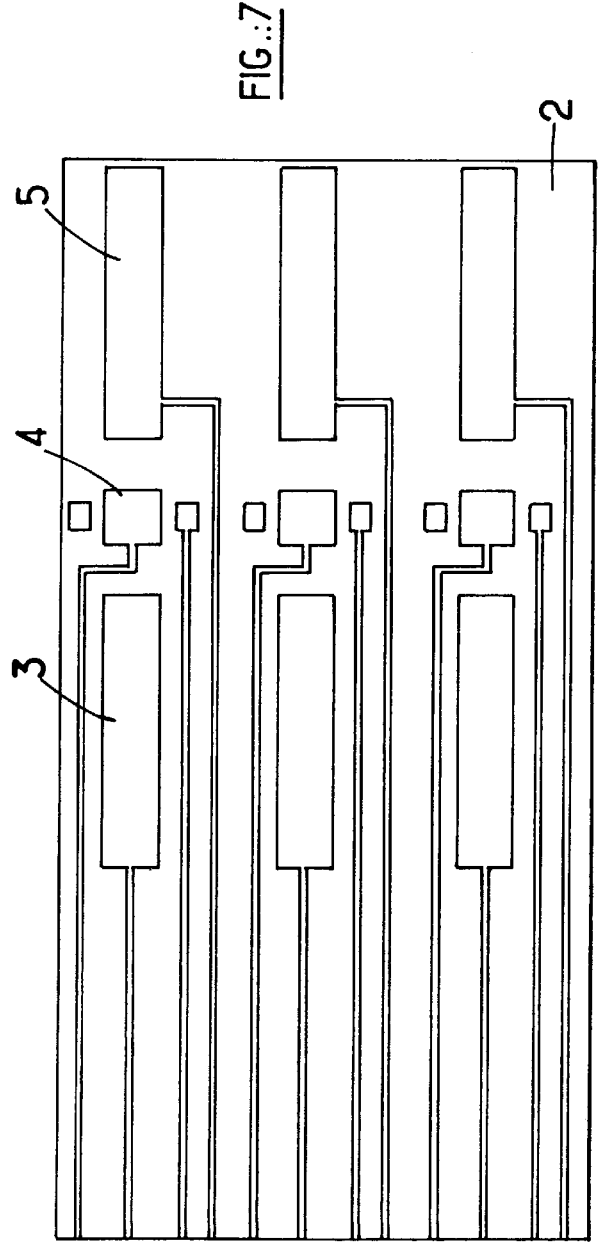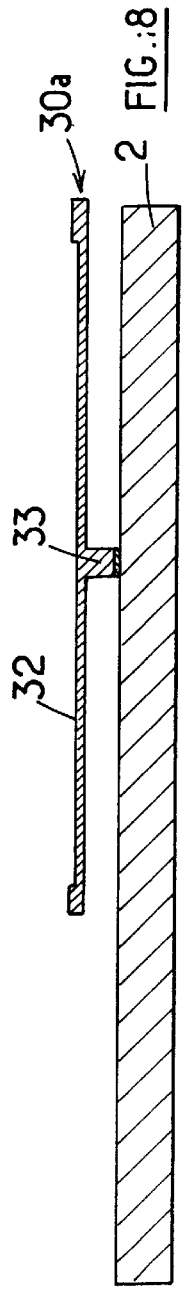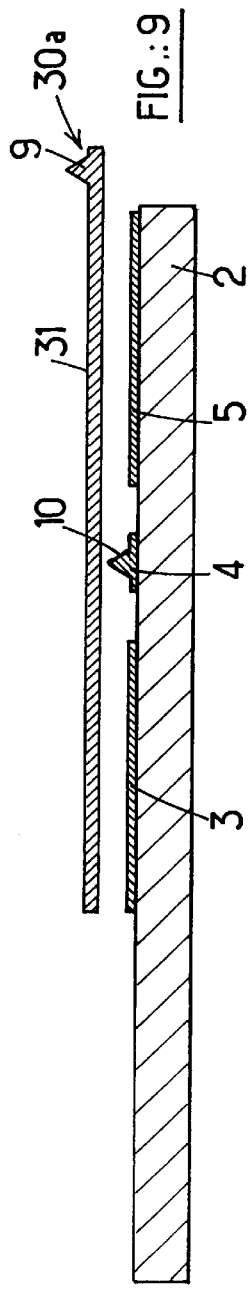

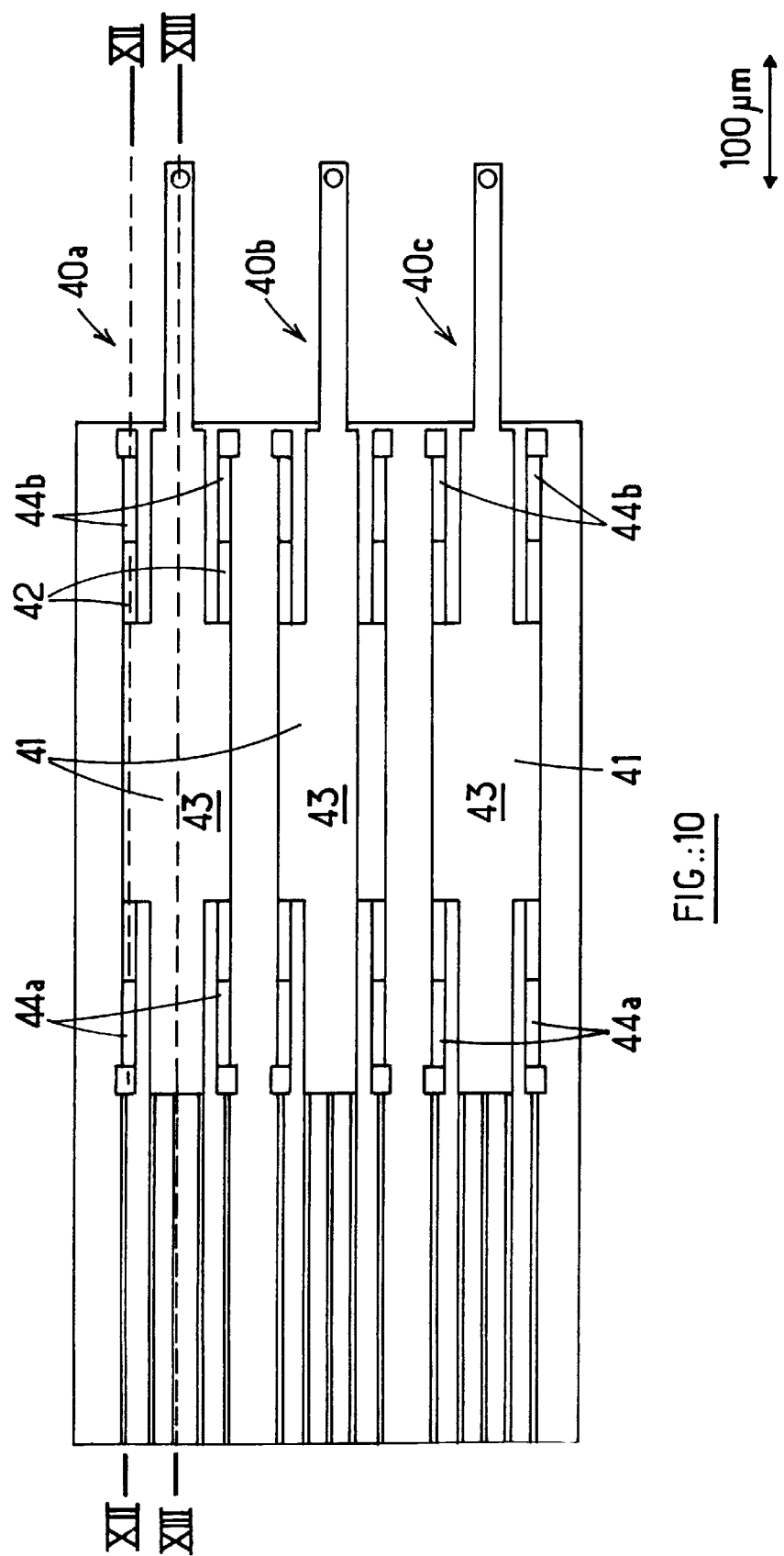

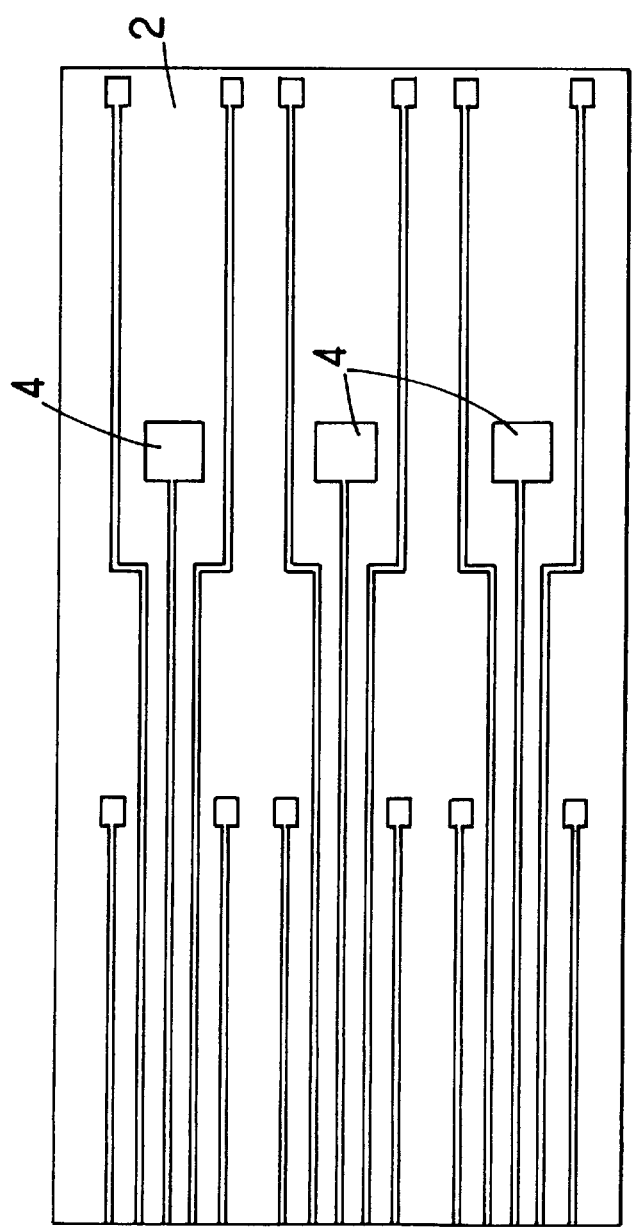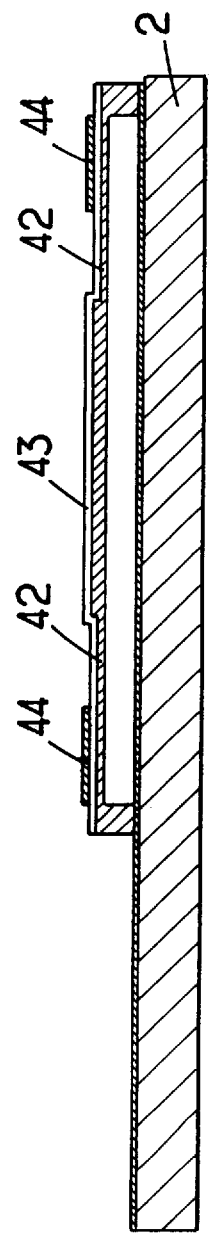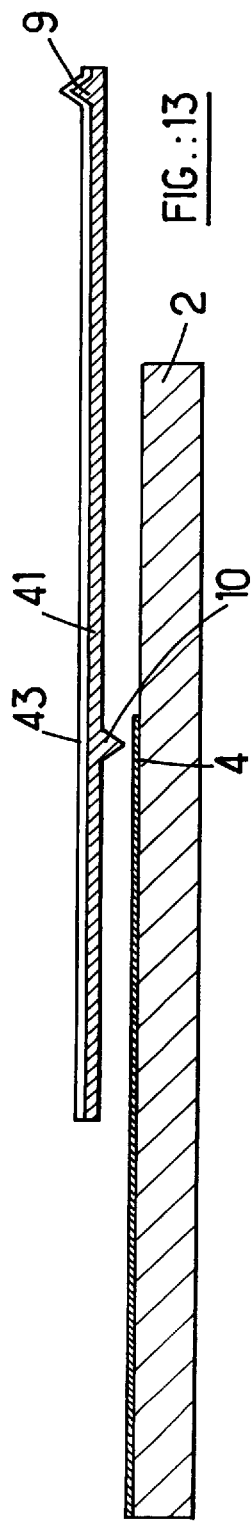

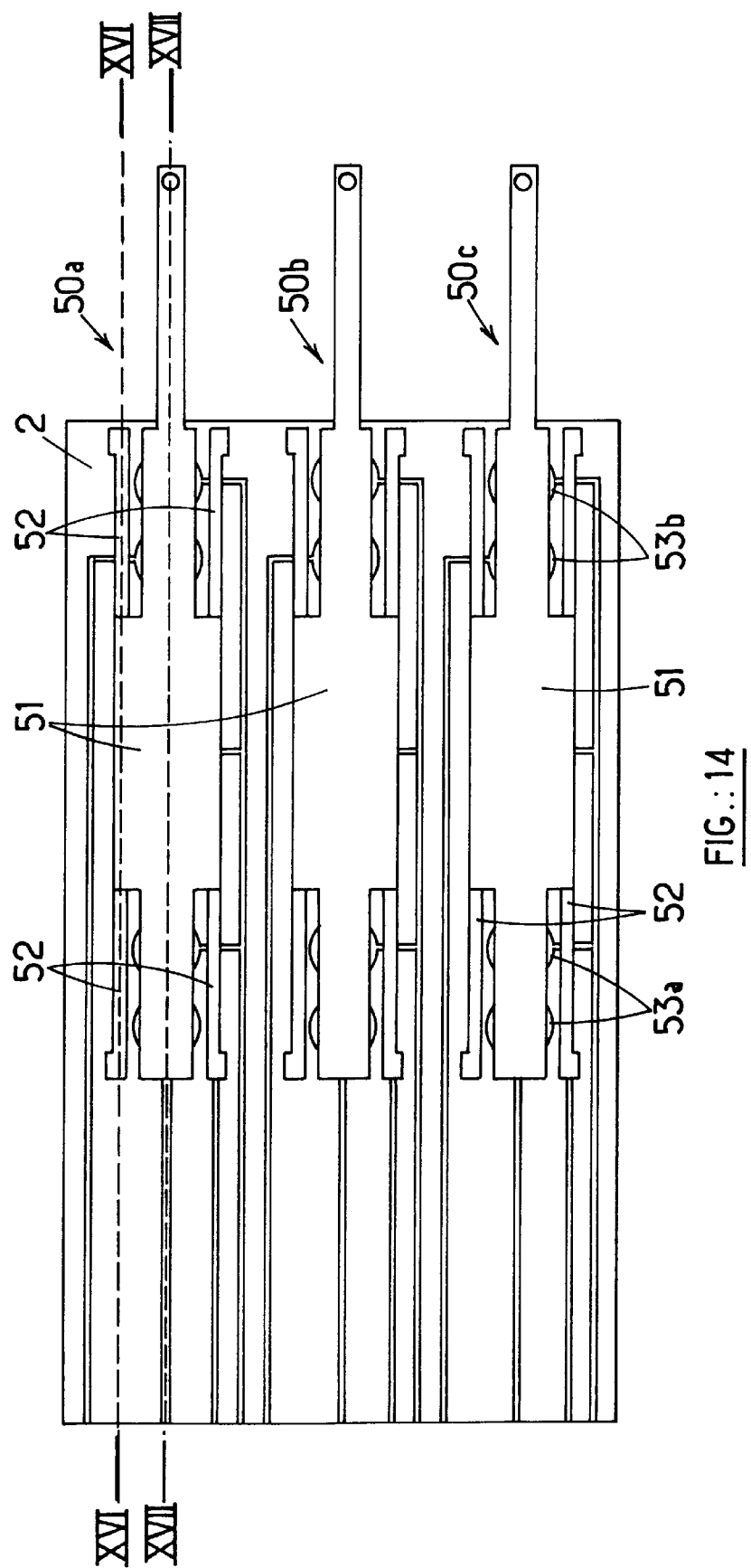
FIG.:14

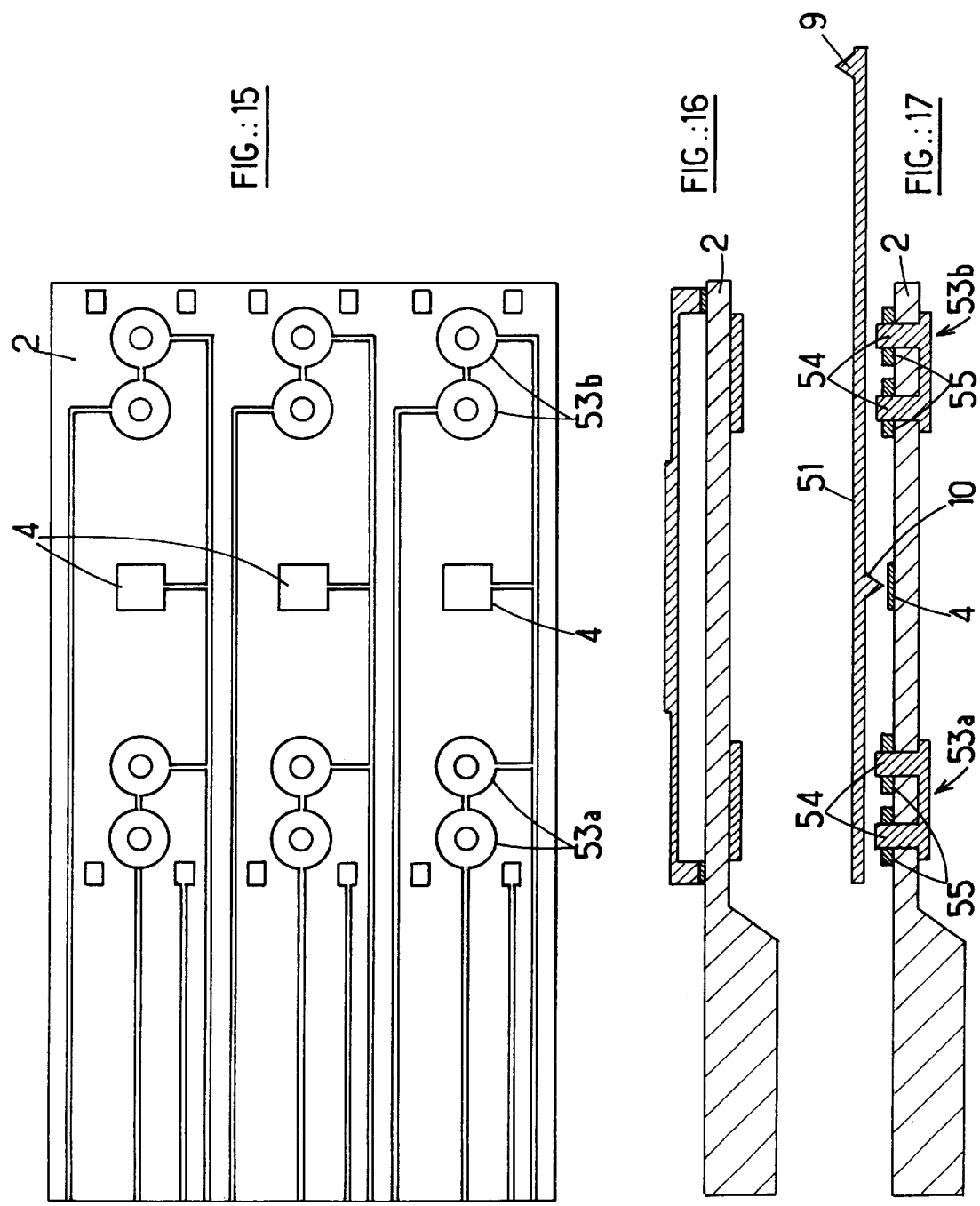

TUNNEL EFFECT SENSOR, SUITABLE FOR DETERMINING THE TOPOGRAPHY OF A SURFACE

BACKGROUND OF THE INVENTION

1. Field of the Invention

The present invention concerns a tunnel effect sensor intended to be used in atomic force microscopes, for example.

2. Description of the Prior Art

A sensor of this type is described in patent EP 0 262 253 and is shown in FIG. 9 of the document in particular.

In this case, the sample to be examined is placed on a base mobile along three perpendicular axes X, Y and Z. The measurement head includes a tactile point that follows the surface to be examined and which is carried by a cantilever arm. The free end of the latter can be moved relative to a fixed arm parallel to the cantilever arm by an electrostatic force generated by respective capacitor plates on the two arms. Protuberances are provided at the free ends of the latter between which a tunnel current is established that can be varied by varying the distance between the two protuberances by means of a voltage established between the capacitor plates.

To examine the topography of the surface of a sample, the tactile point is brought close to the sample by moving the sample-holder base along the Z axis, for example. The distance between the tactile point and the surface to be examined is then adjusted precisely to cause the tactile point to interact with the surface to be examined, the force of interaction being reflected in changes in the tunnel current flowing between the two protuberances. The surface to be examined is then explored by moving the sample along the X and Y axes.

If the tactile point encounters a hollow or an asperity, the cantilever arm is deflected, which modifies the distance between the two protuberances and consequently the tunnel current between them. The latter being compared continuously with a set point value, an error signal is generated.

The latter is then used to move the sample-holder along the Z axis to compensate the error. The feedback signal needed for this is also used as a parameter representing the corresponding local "height" of the surface to be examined.

By scanning this surface in this way, the successively registered feedback signals can be used to trace curves of the level of this surface.

It can therefore be seen that the distance between the two protuberances of the beams (typically in the order of one nanometer) must be constantly corrected by commanding movement of the sample-holder along the Z axis. This is an extremely severe constraint on the precision of the device for moving the sample-holder, which must also move the latter along the other two axes (X or Y) with great precision.

This constraint is all the more severe in that the distance between the point at which the tunnel effect is produced and its electrode can vary by only a few nanometers for the tunnel effect to be measurable.

Another drawback of the prior art device is the fact that the protuberances may collide in the event of an unfortunate exaggerated movement of the sample-holder, which could seriously damage the sensor.

Finally, the set of beams is placed in front of the sample-holder and therefore blocks the field of view below the tactile point so that convenient visual observation by means of the usual instruments of the region in which the sample and the sample-holder are located is made difficult.

An aim of the invention is to provide a tunnel effect sensor that does not have the disadvantages just mentioned.

SUMMARY OF THE INVENTION

The invention therefore consists in a tunnel effect sensor including:
- a fixed substrate,
- a sample-holder mobile relative to said substrate along three perpendicular axes,
- a feeler arm suspended elastically relative to said substrate, adapted to be placed in contact with a point on a surface of a sample fixed to said sample-holder, provided to this end with a tactile point that can be moved in a direction normal to the surface and carrying a tunnel point in the vicinity of a tunnel electrode attached to said substrate, and
- control means including:
  - a control loop for slaving the distance between said tunnel point and its electrode to a predetermined value corresponding to a tunnel current set point value, said loop generating to this end a tunnel current error signal used to adjust said distance, an integrated value of said error signal being used as a signal representative of the profile of said surface,
  - first actuator means operating on said feeler arm to apply a force to it along said third perpendicular axis so that said distance can be preset to a predetermined value in accordance with a control signal,
  - second actuator means also operating on said feeler arm to apply to it a torque in the direction opposite to that generated by said first actuator means, and
  - said control loop further comprising means for applying said error signal to said second actuator means and for applying to said first actuator means a control signal formed from the difference between said adjustment signal and said integrated error signal.

By virtue of the above features, a force exerted by a sample on the tactile point and tending to modify the distance between the tunnel point and its associated electrode can be compensated by the actuator means integrated into the sensor itself without it being necessary to move the sample-holder along the third axis. Accordingly, the latter does not require ultra-precise control in the nanometer range along this third axis, the control requirement being confined to initially moving the sample-holder towards the sensor. The mechanism of the sample-holder can therefore be simpler than in the prior art.

Furthermore, it is then possible for the area in which the tactile point moves to be totally unimpeded and therefore more easily observable.

In accordance with other advantageous features of the invention the actuator means can be of the electrostatic, magnetic or thermal type.

The invention also consists in a multiple tunnel effect sensor comprising a plurality of individual sensors as defined hereinabove.

In accordance with the invention, for example during the determination of a surface profile, the sample-holder is driven along only two perpendicular axes to enable the tactile point to scan the surface. In contrast, no movement is necessary in the measurement direction, this movement being catered for by the feeler arm of the sensor. Thus if the sensor is of the multiple type, each individual sensor can individually sense the profile variations to which it is subjected. This individual sensing by a plurality of juxtaposed individual sensors would not be possible with the sensor of the aforementioned European patent because in this case the variation in the tunnel distance could only be compensated by moving the sample-holder by the same amount simultaneously with respect to all of the individual sensors. The benefit of a multiple sensor that is no more difficult to fabricate than a single sensor but which enables a profile measurement to be carried out much more quickly than with a single sensor is evident.

Other features and advantages of the invention will emerge from the following description given by way of example only and with reference to the accompanying drawings.

BRIEF DESCRIPTION OF THE DRAWINGS

FIG. 1 shows an explanatory schematic plan view of a tunnel effect sensor constituting the preferred embodiment of the invention.

FIG. 2 shows a schematic plan view of the substrate of the sensor shown in FIG. 1, the feeler arm of the sensor not being shown.

FIGS. 3 and 4 are respectively schematic sectional views on the line III—III and on the line IV—IV in FIG. 1.

FIG. 5 is a schematic of the sensor and its regulator means.

FIG. 6 is a plan view similar to that of FIG. 1 showing another embodiment of the invention.

FIG. 7 is a plan view analogous to that of FIG. 2 of this second embodiment of the invention.

FIGS. 8 and 9 are respectively sectional views on the line VIII—VIII and on the line IX—IX in FIG. 6.

FIGS. 10 through 13, respectively analogous to FIGS. 1 through 4, show a third embodiment of the invention.

FIGS. 14 through 17, also respectively analogous to FIGS. 1 through 4, show a fourth embodiment of the invention.

DETAILED DESCRIPTION OF THE PREFERRED EMBODIMENTS

FIGS. 1 through 4 show one preferred embodiment of a sensor in accordance with the invention. A sample E (which can be seen only in FIGS. is 1 and 4) is fixed to a sample-holder P which can be moved along three perpendicular axes, movement along the Z axis (up and down in the plane of FIG. 4) requiring only relatively coarse movement control, by virtue of the invention, whereas the other movements of the sample-holder P require relatively coarse and relatively fine control. These movements are preferably executed by means of piezoelectric actuators, well known to the skilled person, and are not shown in the drawings.

Note that the attitude in space of the sample-holder P and consequently of the sample E itself is immaterial, that represented being arbitrary and serving only to facilitate the following description.

The tunnel effect sensor 1 comprises a base 2 that can be a semiconductor substrate on which the units of the sensor can be fabricated by photolithographic and micro-miniature machining techniques that are also well known to the skilled person.

In the embodiment shown, the sensor shown is of the multiple type and comprises three juxtaposed identical individual sensors 1a, 1b and 1c that share the same substrate 2. In a multiple sensor of this kind the number of individual sensors can be other than three and is limited only by design and fabrication constraints.

Each of the individual sensors has three electrodes 3, 4 and 5 deposited on the surface of the substrate 2. They are generally rectangular in shape, for example.

Each individual sensor 1a, 1b and 1c also includes a relatively rigid electrically conductive feeler arm 6 formed by a plate 7 generously covering the associated electrodes 3, 4 and 5 and a tongue 8 which extends this arm out of the area defined by the substrate 2.

The arm 6 carries at one end, i.e. at the free end of the tongue 8, a tactile point 9 adapted to explore the surface S of the sample E whose topography is to be determined.

The feeler arm 6 includes a second point 10, known as the "tunnel point" (FIG. 4), in this embodiment oriented in the opposite direction to the tactile point 9 and arranged relative to the electrode 4 so that a tunnel current can be caused to flow through the gap between the tunnel point 10 and the electrode 4. To benefit from the tunnel effect between the electrode 4 and the point 10, this gap must be extremely small, typically in the order of only a few nanometers. If the current established for a gap of this size is denoted i, increasing the gap by only 0.1 nm gives rise to a current of $2i$, a variation that can easily be detected and exploited to control a control loop.

The feeler arm 6 in each individual sensor is elastically connected to the substrate 2. In this embodiment this elastic connection is provided by elastic blades 11 disposed laterally of the feeler arm 6 and connected to the latter and to the substrate 2 at attachment points 12. The elastic blades 11 bias the feeler arm 6 in a direction away from the substrate 2 by generating a resultant force F perpendicular to the top surface of the substrate 2 (see FIG. 4).

The resultant F of the forces which therefore tend to move the feeler arm 6 in each individual sensor away from the substrate 2 are counterbalanced in accordance with the invention by control means that include two separate actuators adapted to generate respective forces $F_3$ and $F_5$ which tend to move the feeler arm 6 towards the substrate 2.

In the example of FIGS. 1 through 4 these actuators are of the electrostatic type and are respectively formed by the electrodes 3 and 5 in combination with the feeler arm 6, which is preferably at ground potential. In the remainder of the description these actuators are respectively designated by the combined references 3-6 and 5-6.

The three electrodes 3, 4 and 5 are connected to a control loop 13 by respective conductors 14 also deposited on the substrate 2. A control loop of this kind is provided for each individual sensor 1a, 1b and 1c.

Note that the actuators 3-6 and 5-6 generate torques on the feeler arm 6 in opposite directions relative to the virtual pivot point formed by the tunnel point 10 and the electrode 4.

Note that this virtual pivot point is characterized by the absence of any bearing force, since there is no contact, and consequently that rotation of the arm about the virtual pivot point is not accompanied by any loss of mechanical energy. This fact is important for the accuracy of the measurement.

FIG. 5 shows one preferred embodiment of the control loop 13. To be more precise, the electrode 4 in each individual sensor is connected to a measurement resistor 15, the tunnel current being generated by means of a supply 16 providing the tunnel voltage $U_T$. This current therefore flows along a path between the voltage supply 16 and ground via the resistor 15, the electrode 4, the tunnel gap, the tunnel point 10 and the feeler arm 6 of the individual sensor concerned, this arm being grounded.

The tunnel current is measured at the terminals of the resistor 15 by means of an instrumentation amplifier 17 the output of which is applied to the non-inverting input of another instrumentation amplifier 18 configured as a comparator. The inverting input of the amplifier 18 is connected to a supply 19 providing a reference voltage $U_{ref}$, the latter representing the tunnel current set point value.

The amplifier 18 therefore supplies an error signal representing the effect of the actual tunnel current flowing through the tunnel point relative to the tunnel current set point value.

The output of the instrumentation amplifier 18 is connected to an integrator 20 which supplies a voltage $U_1$ at its output. This output is connected to the electrode 5 and to a measurement output 21 of the circuit from which the wanted signal representative of the topography of the surface S is taken.

The voltage $U_1$ is also applied to the inverting input of another instrumentation amplifier 22 the non-inverting input of which is connected to a supply 23 of a variable voltage $U_{tot}$ intended essentially to determine the force with which the tactile point 9 must press on the surface S of the sample E. The operational amplifier 22 supplies at its output the voltage $U_{tot}-U_1$ which is applied to the electrode 3 of the individual sensor.

The individual sensors all work in exactly the same way, as follows.

Assume firstly that the system is at rest, the control loop 13 is not energized and the sample-holder P is spaced away from the tactile point 9.

Given these conditions, the elastic blades 11 hold the feeler arm 6 away from the substrate 2, the gap at the tunnel point 10 being 2 $\mu$m to 10 $\mu$m, for example. The feeler arm is parallel to the surface of the substrate 2.

The control loop 13 is connected to the supply, the voltages $U_T$ and $U_{ref}$ having preset values. The voltage $U_{tot}$ is set to a positive value. The output of the integrator 20 is limited by design to values in a range from zero volts to a value equal to the voltage $U_{tot}$.

At this time the output of the integrator 20 is equal to zero and the output of the amplifier 22 is equal to $U_{tot}$. This voltage being applied to the electrode 3, the actuator 3-6 generates a force $F_3$ that moves the feeler arm 6 towards the substrate 2 by pivoting it anticlockwise (as seen in FIG. 5). The voltage $U_{tot}$ is adjusted to a value such that the point 10 is at a distance from the electrode 4 so far preventing the creation of a tunnel current, which distance can be between 100 nm and 1000 nm, for example.

When, under the above conditions, the sample E is moved towards the tactile point 9 so as to apply a certain force to it, the tunnel point 10 moves towards the electrode 4 until the tunnel current is greater than the set point value represented by the voltage $U_{ref}$. The amplifier 18 then generates an error signal which becomes positive, with the result that the integrator 20 produces an increasing voltage at its output. Accordingly, the amplifier 22 produces a decreasing voltage, the effect of which is to increase the force $F_5$ applied to the feeler arm 6 by the actuator 56 and to reduce the force $F_3$ applied to it by the actuator 3-6. The force applied by the point 9 to the feeler arm 6 is therefore also reduced.

The position of the tactile point 9 can therefore be measured by determining the voltage $U_1$. By scanning the surface of the sample it is possible to determine its topography by simultaneously recording the output signals of all the individual sensors.

FIGS. 6 through 9 show a variant of the tunnel effect sensor that has just been described. It differs essentially from the embodiment of FIGS. 1 through 4 in that the feeler arm 31 in each individual sensor 30a, 30b and 30c is flanked along all of its length by elastic blades 32 on respective opposite sides of the feeler arm 31, to which they are joined by their ends. In the middle, the elastic blades 32 are fixed to the substrate 2 of the sensor by attachments 33. The tactile point 9 of each individual sensor is on a triangular end part 34 of its feeler arm.

FIGS. 10 through 13 show another embodiment of the sensor in accordance with the invention in which each individual sensor 40a, 40b and 40c includes a feeler arm 41 elastically suspended by elastic blades 42 in the same manner as the feeler arm 6 of the embodiment of FIGS. 1 through 4. However, in this case, each individual sensor includes thermal type actuators.

To be more precise, the feeler arm 41 and the elastic blades 42 attaching this arm to the substrate 2 are covered with an insulating layer 43. Resistive elements 44a and 44b are deposited on the parts of this insulating layer covering the elastic blades 42, forming with the elastic blades bimetallic thermal actuators for controlled deformation of the blades by electrical passing through them. By virtue of appropriate adaptations that will be evident to the skilled person, the resistive elements 44 can be controlled by a control loop similar to the loop 13 from FIG. 5 to act as an actuator in the same way as the actuators 3-6 and 5-6 of the embodiment of FIGS. 1 through 4.

FIGS. 14 through 17 show a fourth embodiment of a sensor in accordance with the invention. In this case each individual sensor 50a, 50b and 50c of the multiple sensor includes a feeler arm 51 and elastic blades 52 identical to those used in the embodiment of FIGS. 1 through 4. However, the actuators are here of the magnetic type. To this end, each individual sensor includes two magnetic circuits 53a and 53b (FIG. 17) under respective ends of the feeler arm 51. These magnetic circuits include polepieces 54 passing through the substrate 2. Coils 55 are disposed around polepieces on the surface of the substrate facing the feeler arm. These coils can be controlled by an electronic circuit analogous to that described with reference to FIG. 5, subject to appropriate adaptations that will be evident to the skilled person. Of course, in this case, the sensor includes a feeler arm 51 that is at least in part made from a ferromagnetic material such as an alloy of Ni and Fe, for example.

A practical embodiment of a multiple sensor in accordance with the invention can comprise ten individual sensors disposed parallel to each other on the substrate 2 with a distance of 60 $\mu$m between them, for example. Each feeler arm can have a range of movement of 2 $\mu$m, being individually controlled in the manner described hereinabove. The resolution can be 0.1 nm. The tactile point can be of diamond or coated with diamond and have a radius of 10 nm and a half-angle at the apex of approximately 10°.

In the first three embodiments described the feeler arm can be made of doped diamond which confers the necessary hardness and conductivity on the tactile point.

The forces $F_3$ and $F_5$ can be between 1 nN and 100 nN. For electrodes 3 and 5 having dimensions of 50 $\mu$m×200 $\mu$m, for example, a force of 350 nN can be obtained with an electric field of 2 V/$\mu$m.

The sensor of the invention can be mounted on a CMOS integrated circuit after being fabricated separately.

I claim:

1. A tunnel effect sensor including:

a fixed substrate, a sample-holder mobile relative to said substrate along three perpendicular axes, a feeler arm suspended elastically relative to said substrate, adapted to be placed in contact with a point on a surface of a sample fixed to said sample-holder, provided to this end with a tactile point that can be moved in a direction normal to the surface and carrying a tunnel point in the vicinity of a tunnel electrode attached to said substrate, and control means including:

a control loop for slaving the distance between said tunnel point and its electrode to a predetermined value corresponding to a tunnel current set point value, said loop generating to this end a tunnel current error signal used to adjust said distance, an integrated value of said error signal being used as a signal representative of the profile of said surface, first actuator means operating on said feeler arm to apply a force to it along said third perpendicular axis so that said distance can be preset to a predetermined value in accordance with a control signal, and second actuator means also operating on said feeler arm to apply to it a torque in the direction opposite to that generated by said first actuator means, and said control loop further comprising means for applying said error signal to said second actuator means and for applying to said first actuator means a control signal formed from the difference between said adjustment signal and said integrated error signal.

2. The sensor claimed in claim 1 wherein said actuators are disposed on respective opposite sides of said tunnel point.

3. The sensor claimed in claim 2 wherein said control loop includes a first instrumentation amplifier adapted to receive on respective inputs said set point signal and a signal representative of said tunnel current, an integrator connected to the output of said first amplifier and having an output connected to said second actuator and to the output of said sensor, and a second instrumentation amplifier for establishing the difference between the output of said integrator and said control signal, the output of said second amplifier being connected to said first actuator.

4. The sensor claimed in claim 1 wherein said actuators are of the electrostatic type.

5. The sensor claimed in claim 1 wherein said actuators are of the thermal type.

6. The sensor claimed in claim 1 wherein said actuators are of the magnetic type.

7. A multiple tunnel effect sensor assembly comprising a plurality of juxtaposed tunnel effect sensors, each of said sensors including:

a fixed substrate, a sample-holder mobile relative to said substrate along three perpendicular axes, a feeler arm suspended elastically relative to said substrate, adapted to be placed in contact with a point on a surface of a sample fixed to said sample-holder, provided to this end with a tactile point that can be moved in a direction normal to the surface and carrying a tunnel point in the vicinity of a tunnel electrode attached to said substrate, and control means including:

a control loop for slaving the distance between said tunnel point and its electrode to a predetermined value corresponding to a tunnel current set point value, said loop generating to this end a tunnel current error signal used to adjust said distance, an integrated value of said error signal being used as a signal representative of the profile of said surface, first actuator means operating on said feeler arm to apply a force to it along said third perpendicular axis so that said distance can be preset to a predetermined value in accordance with a control signal, and second actuator means also operating on said feeler arm to apply to it a torque in the direction opposite to that generated by said first actuator means, and said control loop further comprising means for applying said error signal to said second actuator means and for applying to said first actuator means a control signal formed from the difference between said adjustment signal and said integrated error signal.

* * * * *